United States Patent [19]
Tombal et al.

[11] Patent Number: 5,369,669
[45] Date of Patent: Nov. 29, 1994

[54] DATA TRANSMISSION SYSTEM FOR SYNCHRONOUSLY TRANSMITTING AN AUXILIARY BITSTREAM WITHIN A MAIN BITSTREAM

[75] Inventors: Jurgen M. E. Tombal, Schilde; Peter P. F. Reusens, Laarne; Daniel Sallaerts, Aarschot, all of Belgium

[73] Assignee: Alcatel N.V., Amsterdam, Netherlands

[21] Appl. No.: 994,827

[22] Filed: Dec. 22, 1992

[30] Foreign Application Priority Data

Dec. 24, 1991 [EP] European Pat. Off. ........ 91203411.3

[51] Int. Cl.⁵ .................... H04B 14/04; H04J 3/12
[52] U.S. Cl. .................... 375/25; 370/110.4
[58] Field of Search ............ 370/110.1, 110.4, 111, 370/112, 113; 375/25

[56] References Cited

U.S. PATENT DOCUMENTS

| | | |
|---|---|---|
| 4,071,692 | 1/1978 | Weir . |
| 4,131,761 | 12/1978 | Giusto .................... 370/110.4 |
| 4,408,325 | 10/1983 | Grover .................... 370/110.4 |
| 4,550,403 | 10/1985 | Beynie .................... 370/110.4 |

FOREIGN PATENT DOCUMENTS

40833/89 3/1990 Australia .

60260255 12/1985 Japan .

OTHER PUBLICATIONS

J. B. Bushner, "Ternary Line Signal Codes", *Proceedings of the International Seminar on Digital Communications*, 15 Mar. 1974, pp. F1–F9.

*Primary Examiner*—Stephen Chin
*Assistant Examiner*—Duane Kobayashi
*Attorney, Agent, or Firm*—Robbins, Berliner & Carson

[57] ABSTRACT

A data transmission system is proposed in which an auxiliary bitstream of low bitrate (AUX) is coded together with a main bitstream of high bitrate (PRIM) without increasing the transmission rate above the high bitrate. This auxiliary bitstream (AUX) is moreover transmitted synchronously with the main bitstream (PRIM). Transmitter (T) divides the main bitstream (PRIM) in periodically occurring blocks of Y bits and codes one bit of the auxiliary bitstream (AUX) in each of the blocks by using a first (AMI) or a second (VAMI) coding law according to the binary value of that bit. The second law is constructed by violating the first coding law (AMI) according to a predetermined violation law. Redundancy in the first coding law (AMI) is used to introduce symbol sequences not permitted under this first coding law (AMI) and to so obtain the second coding law (VAMI).

18 Claims, 9 Drawing Sheets

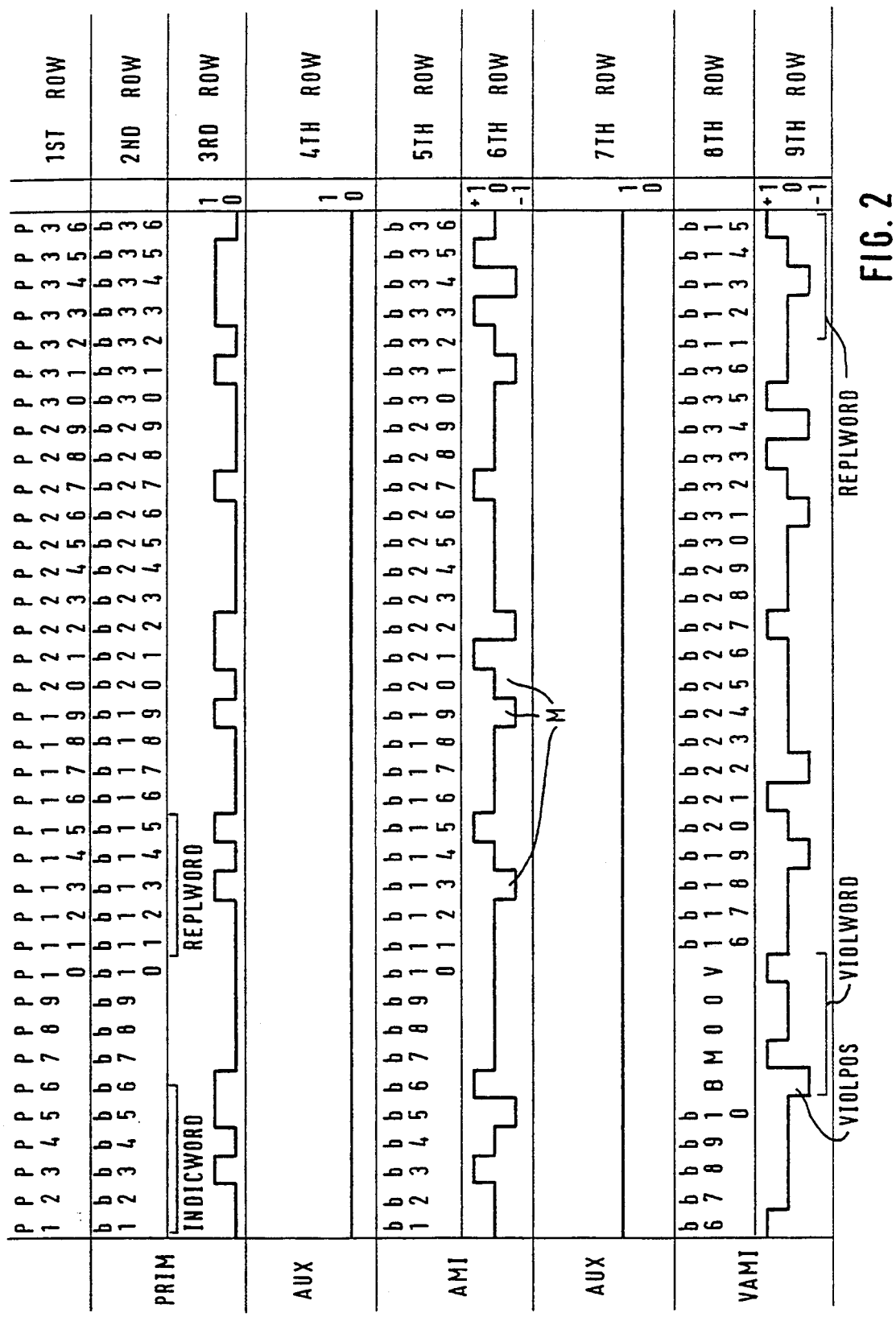

DATA TRANSMISSION SYSTEM FOR SYNCHRONOUSLY TRANSMITTING AN AUXILIARY BITSTREAM WITHIN A MAIN BITSTREAM

TECHNICAL FIELD

This invention relates to a data transmission system for transmission of a main bitstream which is encoded according to a selected one of a plurality of coding laws to additionally transmit an auxiliary bitstream together with said main bitstream.

BACKGROUND ART

Such a data transmission is already known in the art, e.g. from the published European application EP-A2-0359072. Therein a data transmission system is described which simultaneously codes a main bitstream of high bitrate and an auxiliary bitstream of lower bitrate without increasing the transmission rate of the coded symbols above that high bitrate. This is done by switching between two coding laws as explained hereafter.

In the known system the main bitstream is normally coded according to a first coding law, but a second coding law is selected when a specific bit pattern is detected in the main bitstream, e.g. a string of 8 zeroes. The duration of this change in coding law is determined by the transmitter according to the binary value of the next bit to be transmitted at the auxiliary bitstream. A receiver reconstructs the main and the auxiliary bitstream by detecting this change in coding law and by determining its duration.

In so doing the rate at which the auxiliary bitstream can be coded and transmitted is dependent on the statistical properties of the main bitstream, i.e. on the rate at which strings of 8 zeroes appear. It can therefore not be guaranteed that the auxiliary bitstream can be transmitted at a fixed bitrate relative to the bitrate of the main bitstream. It can also not be guaranteed that the auxiliary bitstream is received with uniform delay. This asynchronous transmission of the auxiliary bitstream results in the need for buffers in the transmitter as well as in the receiver. Whenever a bit of the auxiliary bitstream is available the transmitter has to buffer it together with the following bits until the specific bit pattern occurs in the main bitstream. The receiver on the other hand has to buffer the bits in order to assure a uniform delay for all auxiliary bits.

DISCLOSURE OF INVENTION

An object of the present invention is to provide a data transmission system of the above known type, but wherein the secondary bitstream can be transmitted synchronously at a fixed low bitrate relative to the bitrate of the main bitstream.

According to the invention, this is achieved due to the fact that said data transmission system includes a transmitter which is adapted to arrange said main bitstream in superframes comprising periodically occurring blocks of Y bits and to encode each of said blocks according to said selected coding law, and that said selection is function of the value of at least one corresponding information unit of said auxiliary bitstream.

The number of blocks of Y bits within a superframe and the length of such a superframe are chosen in such a way that each information unit of the secondary bitstream corresponds to exactly one of these blocks of Y bits. Such an information unit comprises a fixed number of auxiliary bits, each different information unit for instance corresponding to the selection of one specific coding law. In this way the auxiliary bitstream can be transmitted at a fixed bitrate, relative to the bitrate of the main bitstream and synchronously with that main bitstream. No buffering of bits of the auxiliary bitstream is needed in the transmitter or in the receiver. The receiver only has to detect which coding law was used in order to reconstruct both bitstreams.

A characteristic feature of the present invention is that said plurality of coding laws consists of a first coding law and a second coding law which is derived from said first coding law by violating it in at least one position within each of said blocks coded by means of said second coding law, said violation being realized by introducing symbols, not permitted under said first coding law, and that said violations are introduced according to a violation law which is a predetermined function of an indication word within each of said blocks.

The receiver can easily detect the change in coding law if such sequences or violations are deliberately introduced according to a violation law.

The second coding law is identical to the first coding law except at positions affected by the violation law. As this violation law affects a restricted number of positions, the transmitter and the receiver can be kept relatively simple as they basically have to code, respectively decode, via the first coding law. The extra effort needed to introduce and detect symbols according to the violation law can be kept to an absolute minimum. Some bits of the main bitstream can no longer be directly coded within the fixed length block because of the introduction of symbols determined by the violation law without increasing the transmission rate. This is solved by making the violation law a predetermined function of those bits and thus indirectly coding these bits.

Another characteristic feature of the present invention is that within each of said blocks coded according to said second coding law a predetermined violation word is introduced according to said violation law thereby replacing a number of bits of said main bitstream, said violation word containing at least one violation and at least one symbol not violating said first coding law.

Introducing a violation word not only containing a violation but also symbols not violating the first coding law has the advantage that the latter symbols can be determined in such a way as to improve the signal characteristics of the coded symbol stream. If, for instance, the first coding law has optimal characteristics, such as the AMI-code for binary to ternary coding, these symbols can be used to counterbalance the negative effect on the signal characteristics due to the introduction of violations and hence also allow for the reuse of conventional repeater stations.

Still another characteristic feature of the present invention is that the position of said violation word is a predetermined function of the value of an indication word which consists of bits of said main bitstream located at first predetermined positions within said block, and that said indication word is inhibited from transmission thus leaving place for said replaced bits to be transmitted within said blocks respecting their predetermined length of Y bits.

As the length of each block is Y, introducing the violation word means that a number of bits of the main bitstream, equal to the number of symbols in the violation word, can no longer be directly transmitted without increasing the transmission rate above the high bitrate as mentioned before. This problem is solved using these bits to determine the position of the violation word and so making the violation law a predetermined function of these bits. The solution of this problem is further characterized by taking these bits always from the same predetermined positions within each block and inhibiting them from further transmission. Thus there is place left within each block of Y bits for transmission of the bits actually replaced by the violation word. In this way a uniquely decodable coded symbol stream is achieved.

Yet another feature of the present invention is that said transmitter determines the position of said violation word and reorders bits in other positions than said first predetermined positions in the following manner: the first of said bits are released in sequence in the first positions of said blocks leaving open second predetermined positions until the position preceding the position of said violation word is reached, the violation word is then introduced, and the bits replaced by said violation word are stored, the following bits are again released in sequence inserting said replaced bits at second predetermined positions within said block, said blocks being then coded by said transmitter using said first coding law transmitting the appropriate symbols of said violation word.

In so doing a concrete way of reordering the bits is proposed for a block coded according to the second coding law. Other ways for reordering such a block are devisable but this one will prove to be particularly advantageous.

A further feature of the present invention is that in case said first coding law is used for said block of Y bits, said transmitter stores the bitgroup at said first predetermined positons and reorders the other bits by releasing them in sequence in the first positions of said blocks inserting said bitgroup at said second predetermined positions, said blocks being then coded by said transmitter using said first coding law.

Because the second coding law necessitates a reordering of the bits of the main bitstream within a block as described above, corresponding bits of a block of the main bitstream will be coded in different positions when using either the first coding law of the second coding law. Therefore, supposing the receiver fails to detect the violation word due to transmission errors, all bits of the block affected can be misinterpreted which results in an error multiplication factor of on average Y division by two with reference to the above described reordering of a block coded using the second coding law. This error multiplication can be reduced by also reordering the bits within a block to be coded according to the first coding law. Apart from the replaced bits and the bitgroup on the first predetermined positions, the bits are on the same position whichever coding law is used. The combination of the two above described reordering schemes results in a minimum error multiplication factor.

A further ancillary feature of the present invention is that said first predetermined positions are the first five positions of said block and that said second predetermined positions are the last five position of said block.

It can be verified that this choice for the aforementioned first and second predetermined positions leads to a minimum coding/decoding delay for the primary bitstream. This choice moreover results in a simple implementation of the transmitter and the receiver.

Another characteristic feature of the invention is that said first coding law is the AMI-code for bipolar electrical signals, and said second coding law, violates said AMI-code by permitting two subsequent marks of the same polarity, the last mark being said violation.

The present invention is hereby concretely used for binary to ternary coding. The violations introduced are easy to detect by the receiver because in AMI-coded signals subsequent marks have to have an opposite polarity.

Another feature of the invention is that said violation word contains at least a first balancing bit which is either a mark or a zero so that subsequent violations are of opposite polarity; and that said violation word contains at least one zero separating said violation from a preceding symbol which can be a mark.

This feature gives the possibility for preserving the characteristics offered by the AMI-code even when violations are added. Firstly, the balancing bit avoids the introduction of a dc level due to subsequent violations of the same polarity. Secondly, the zeroes between mark and violation avoid the well known inter symbol interference caused by two marks of the same polarity being sent in neighbouring positions.

Another aspect of the present invention is that a predetermined synchronization word is transmitted in each of said superframes, and that a receiver, also included in said data transmission system, synchronizes on the block structure of a coded symbol stream, transmitted by said transmitter, using said synchronization word.

From the above it is clear that the block structure of the data is of crucial importance in this data transmission system, meaning that the receiver must for instance be able to detect the start of a superframe. In sending this synchronization word the receiver can execute a conventional synchronization algorithm and decode the coded symbol stream in a reliable way.

Still another aspect of this invention is that said superframe consists of M+1 blocks: a block of Z bits of said main bitstream which is coded in its original sequence, using said first coding law and M blocks of Y bits of said main bitstream coded via a selected one of said first and said second coding law.

The present invention allows for the introduction in the superframe of a block of Z bits with Z possibly smaller than Y so that the auxiliary bitstream can be transmitted at a maximum integer bitrate for a specific value of Y. This block of Z bits is always coded via the first coding law and no reordering has to be performed as it cannot be coded via the second coding law.

Yet another aspect of this invention is that said block of Z bits contains said synchronization word and that a number of bits of said main bitstream equal to the number of symbols in said synchronization word are multiplexed in said auxiliary bitstream and coded in predetermined blocks within said superframe.

The block of Z bits can be advantageously used and its length so determined as to transmit the synchronization word. A number of bits of the primary bitstream replaced by this synchronization word have to be multiplexed within the auxiliary bitstream to meet the demand of equality between transmission rate and the bitrate of the main bitstream. Demultiplexing in the receiver is easy as specific blocks are dedicated to carry these multiplexed primary bits.

A further aspect of the present invention is that after said main and auxiliary bitstreams are coded, the resulting coded symbol stream is further coded using a signal enhancing coding law.

To enhance the signal characteristics of the coded symbol stream this signal enhancing coding law can be used insofar as it does not introduce decoding conflicts at the receiving end.

Still another aspect of the present invention is that said signal enhancing coding law is a third coding law, according to which a string of X+1 zeroes is substituted by a special code word containg at most X zeroes and at least one violation.

More specifically in the domain of ternary bipolar signal transmission, strings of zeroes may not be too long to avoid a clock recovery problem at the receiving end. Conventionally this is overcome by HDB3 zero-substitution, as standardized in CCITT recommendation 6.703. The current invention also provides for zero substitution thus achieving a coded symbol stream with signal characteristics so close to the conventional HDB3-signals, that the coded symbols according to the present invention can equally well be regenerated by conventional HDB3-repeater stations. This obviously saves money when implementing the proposed data transmission system since the old repeater stations need not be replaced.

Another zero substituting law has to be used instead of HDB3 in some cases in order to meet the above mentioned demand for not introducing decoding conflicts. Indeed, the receiver has to be able to distinguish between, for instance, the special zero substituting code word and the violation word.

Still other aspects of the present invention are that said violation word is BM00V where M is said mark, V is said violation, and B is said first balancing bit determined according to the following table,

| B | previous M | previous V |
|---|---|---|
| 0 | + | + |
| − | + | − |
| + | − | + |
| 0 | − | − | representing the polarity of said first balancing bit as function of the polarity of the previous violation and the polarity of the previous mark whilst said synchronization word is MB0M000V and that said third coding law is of the HDB4 type, according to which a string of 5 zeroes is substituted by a code word L000V, where V is said violation and L is a second balancing bit determined according to the following table,

| L | previous M | previous V |
|---|---|---|
| − | + | + |
| 0 | + | − |
| 0 | − | + |
| + | − | − | representing the polarity of said second balancing bit as a function of the polarity of the previous violation and the polarity of the previous mark.

These choices meet the demands specified above, i.e. signal characteristics close to those of conventional HOB3 signals and further guarantee that no decoding conflicts can arise. The latter fact is obtained because the proposed choices for the HDB4 code word, the synchronization word and the violation word are such that the above words cannot be erroneously recognized in the coded symbol stream. The desirable signal characteristics are obtained via the use of balancing bits and a zero-substituting third coding law.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein:

FIG. 2 shows the pulse waveforms of the signals occurring in the data transmission system of FIG. 1 for specific examples of a main or primary and an auxiliary or secondary bitstream, PRIM and AUX respectively;

FIG. 3a shows a bit order change according to an aspect of the invention, prior to the application of a first coding law AMI;

FIGS. 3b to 4b show a bit order change according to an aspect of the invention, using a second coding law VAMI and for different values of an indication word INDICWORD;

BEST MODE FOR CARRYING BUT THE INVENTION

Figure 1:
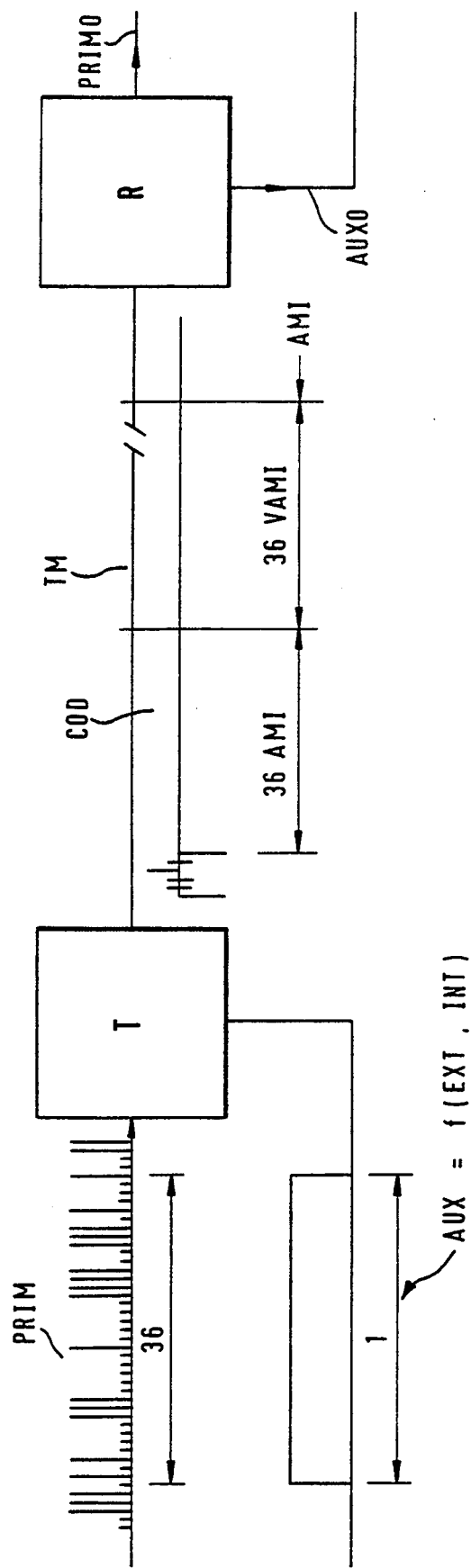
FIG. 1 is a schematic diagram showing the principles of a data transmission system according to the invention.

The data transmission system depicted in FIG. 1 consists of a transmitter T with two binary inputs to which two bitstreams are applied, namely a main or primary bitstream PRIM of high bitrate and an auxiliary or secondary bistream AUX of lower bitrate, the latter possibly containing multiplexed auxiliary data. The transmitter T codes the input bitstreams PRIM and AUX and produces a bipolar (ternary) output signal of coded symbols COD;

a transmission medium TM consisting of at least one electrical wire and possibly including existing HDB3 repeater stations over which the coded symbols COD are transmitted;

a receiver R with as input signal the coded symbols COD, and with as output signals PRIMO and AUXO which are the reconstructed primary and secondary bitstreams, PRIM and AUX respectively.

It is to be noted that although the invention is described using electrical bipolar coded symbols COD and an electrical wire as transmission medium TM, it is equally well applicable to other coded symbols and other transmission media such as optical fibres, wireless transmission and so on.

The secondary bitstream AUX is depicted in FIG. 1 as an external input to the transmitter T to better show the principles of the invention. As already shown in FIG. 1 the secondary bitstream AUX can however be a combination of an external input bitstream EXT and an internal bitstream INT. The latter bitstream possibly containing internal status information of the transmitter T as well as particular bits of the primary bitstream PRIM as will be explained later on. When the secondary bitstream AUX is thus composed of the above mentioned bitstreams INT and EXT, as is the case in FIG. 6, only the external bitstream EXT is applied as a physical input signal, the secondary bitstream AUX being formed within the transmitter T, which will be clarified later with reference to FIG. 6. For now the principles of the invention are best understood by referring to the secondary bitstream AUX as an external input signal to the transmitter T. Similar remarks hold for the receiver R depicted in FIG. 7.

According to the invention, the transmitter T provides for blocks of Y, i.e. 36, bits of PRIM in each of which a bit of the secondary bitstream AUX, hereafter called secondary bit, is coded. When a high bitrate of 2048 Kbit/sec is available, it can be easily verified that no integer low bitrate can be found without introducing blocks of a different length. This point and the exact composition of a superframe will be clarified further on. For now we only consider the blocks of 36 bits in which a secondary bit is coded by switching between two coding laws as shown in FIG. 1 and explained hereafter.

The value of Y is chosen in such a way that during a complete block of bits of the primary bitstream PRIM, hereafter called primary bits precisely one secondary bit is present, i.e. to each block of Y bits of PRIM corresponds one bit of AUX. From the equality of the bitrate of PRIM and the transmission rate it follows that the coded symbol stream COD can also be divided in blocks of 36 symbols, each block corresponding uniquely to one block of primary bits. As is shown in FIG. 1 each of these blocks of primary data is coded, according to the value of the corresponding secondary bit, using a first AMI or a second VAMI coding law, i.e. when the corresponding secondary bit equals 0 or 1 respectively.

To detect the change in coding law some redundancy available in the coded symbols COD has to be exploited. In accordance with the invention this is done by determining the second coding law VAMI so as to violate the first coding law AMI according to a specific violation law. More particularly this specific embodiment of the invention determines the VAMI-law as introducing exactly one violation against the well known AMI-rule in a block of coded symbols COD.

The AMI- and VAMI-blocks are depicted as pulse waveforms in FIG. 2 for a specific example of a block of primary bits, PRIM. A 1st row of the figure names the positions p1; . . . ; p36 within a block of 36 bits or symbols, a 2nd row identifies the bits of the primary bitstream PRIM as b1; . . . ; b36. In a 3rd row a specific example of a block of primary bits PRIM is shown. In a 4th row a corresponding secondary bit AUX shown for which the AMI-rule as shown in rows 5 and 6 is selected. In the 5th row the primary bits b1; . . . ; b36 are shown in the order they will be coded when the AMI-rule is selected for the block. The 6th row depicts the bipolar pulse waveform obtained by applying the conventional AMI-rule to the signal PRIM. The AMI-rule codes binary ones as alternating +1 and −1 signals called marks M, coding a zero as a zero. In case the secondary bit equals 1, as depicted in a 7th row, and so determines that the block should be VAMI-coded a bit order before coding is used as shown in an 8th row and a pulse waveform as in a 9th row is obtained.

As shown in the figure the VAMI-code introduces a violation V against the AMI-code at p10, i.e. the symbol in p10 has the same polarity as the preceding mark M in p7. This violation V of the AMI-code can easily be detected by the receiver R, which deducts from it the value of the corresponding secondary bit. How the violation is inserted, and the reason for inserting it at p10 is explained later on.

A law determining the above violation, hereafter called violation law, is determined in such a way as to provide for transmission of a secondary bitstream AUX without increasing the transmission rate above the bitrate of PRIM and to achieve this without worsening the signal characteristics of the coded symbol stream COD. In particular the VAMI-code should be such that the desirable signal characteristics resulting from the use of the AMI-code are preserved, i.e. dc components should not be present in the coded symbol stream to avoid unsettling receiving amplifiers, and two marks of the same polarity should not be on neighbouring positions because this causes intersymbol interference and misinterpretation in repeater stations or in the receiver R.

Therefore the violation V is introduced according to a specific violation law which is realized by means of a violation word VIOLWORD containing one violation and 4 symbols not violating the AMI-code. These four symbols are chosen in such a way as to meet the above mentioned demands. In this embodiment the word BM00V is chosen as violation word VIOLWORD. The first symbol is a balancing bit B introduced to force subsequent violations V to be of opposite polarity so that these violations V do not cause a dc component in the coded symbol stream. Therefore this first balancing bit B is determined to be a mark M or a zero according to the polarities of the previous mark M and violation V. The appropriate polarities of B are determined according to the following table:

| B | previous M | previous V |
|---|---|---|
| 0 | + | + |
| − | + | − |
| + | − | + |
| 0 | − | − |

The two zeros separate the violation V from any possible previous mark, which has the same polarity, thus avoiding inter symbol interference as mentioned above. The mark M within the violation work VIOLWORD is chosen to avoid decoding conflicts in the receiver R as will be clarified below.

Because the transmission rate is fixed to be equal to the bitrate of PRIM, introducing the violation word VIOLWORD inhibits a predetermined number of bits, in this case 5, of the primary bitstream PRIM to be coded directly within a block of coded symbols. This problem is solved by indirectly coding a predetermined number of bits via the position VIOLPOS of the violation work VIOLWORD. The receiver R, in reconstructing both bitstreams, thus not only has to detect the presence of the violation V but also the position VIOLPOS of this violation word VIOLWORD within each block of coded symbols and derive from VIOLPOS the value of the omitted 5 bits.

This is achieved by storing the value of an indication word INDICWORD at first predetermined positions, more specifically p1; p2; p3; p4; p5, and discarding the corresponding bits b1; ...; b5 of this indication word INDICWORD from the normal data flow. The transmitter T then calculates VIOLPOS according to the latter value i.e. decimal value of INDICWORD at p1; ...; p5 incremented with one gives the position of VIOLWORD within the block of coded symbols, in FIG. 2 this is p6.

Since bits b1; ...; b5 are omitted for transmission the transmitter T has to reorder the bits within the block before they are coded. This coding is for the second coding law VAMI identical to the first coding law AMI except at the positions of the violation word VIOLWORD. As proposed in the invention and depicted in rows 8 and 9 of FIG. 2 the reordering is achieved by sending the bits, from b6 onwards, on positions starting from p1. Once VIOLPOS is reached the violation word is introduced by the transmitter T and the replaced bits REPLWORD, e.g. b11; ...; b15, are stored. Then the transmitter T codes the following bits, from b16 onwards in our example, in sequence inserting REPLWORD at second predetermined positions namely p31; ...; p36. REPLWORD is in this way coded at the end of the block. Thus a uniquely decodable VAMI-block is formed in accordance with the invention. The receiver R reorders the received symbols inserting INDICWORD at the beginning of the block once it has detected VIOLPOS and calculated the binary equivalent of VIOLPOS minus 1 which corresponds to the bits b1; ...; b5.

It can be verified that a minimum length of the blocks has to be provided to carry out this coding scheme because a number of primary bits INDICWORD equal to the number of symbols in the violation word VIOLWORD have to be coded in VIOLPOS. Therefore a block should be at least long enough to introduce the violation word VIOLWORD at the largest possible position VIOLPOS, which is p32 in our embodiment, with a violation word VIOLWORD of 5 symbols. Y has consequently to be at least 36 to leave enough place for the violation word VIOLWORD to be introduced at position p32. Thus a lower bound exists for Y in choosing a violation word of a specific number of symbols and hence also a higher bound for the bitrate of AUX exists in using a specific violation word.

In FIG. 2 it can also be seen that bits on matching positions in the AMI-block and the VAMI-block carry different primary data due to the reordering necessary in a VAMI-block. There are no matches between the entries in the 5th and the 8th rows and these rows indicate which specific primary bit is directly coded in a specific position within a block. As a consequence, when due to a transmission error a violation V cannot be interpreted as such by the receiver R this amounts to a possible misinterpretation of every bit in the block affected and hence to an error multiplication of on average 36 divided by 2 using the above reordering scheme for a VAMI-block. According to the invention this is avoided by also reordering the bits in an AMI-block before they are coded as is shown more clearly in FIG. 3a.

Figure 3A:
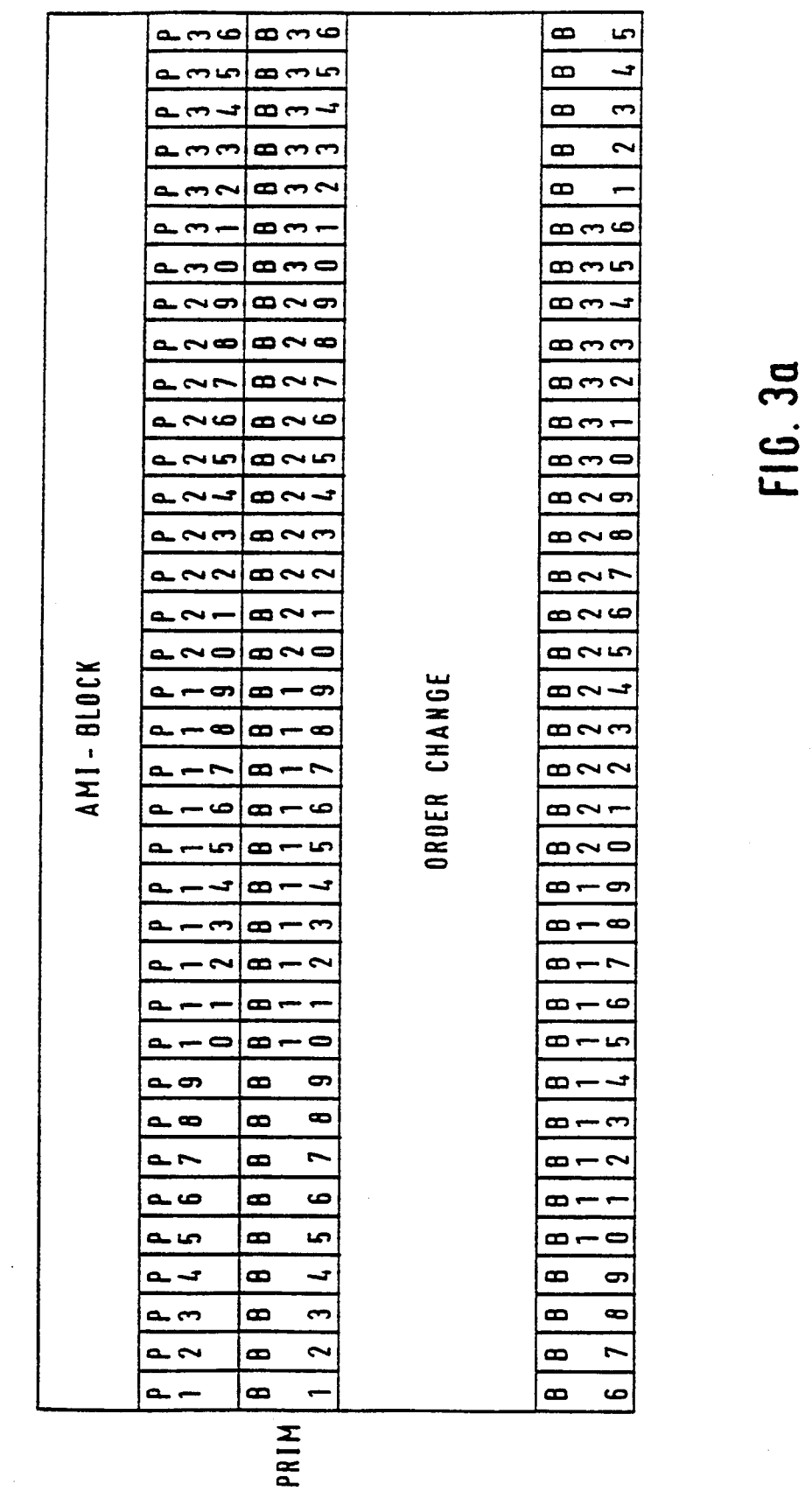

Before the primary bits in FIG. 3a are coded via the AMI-rule they are reordered by the transmitter T. More particularly, the bits in the first predetermined positions p1; ...; p5 which are the bits b1; ...; b5 in FIG. 3a are stored and the following bits, from b6 onwards are coded, respecting their original sequence, from the first position onwards inserting the stored bits b1; ...; b5 at second predetermined positions p32; ...; p36. As is shown in FIG. 3a, for this specific embodiment, this means that the first five bits are put in the last five positions of the block before this block is coded.

Figure 3B:
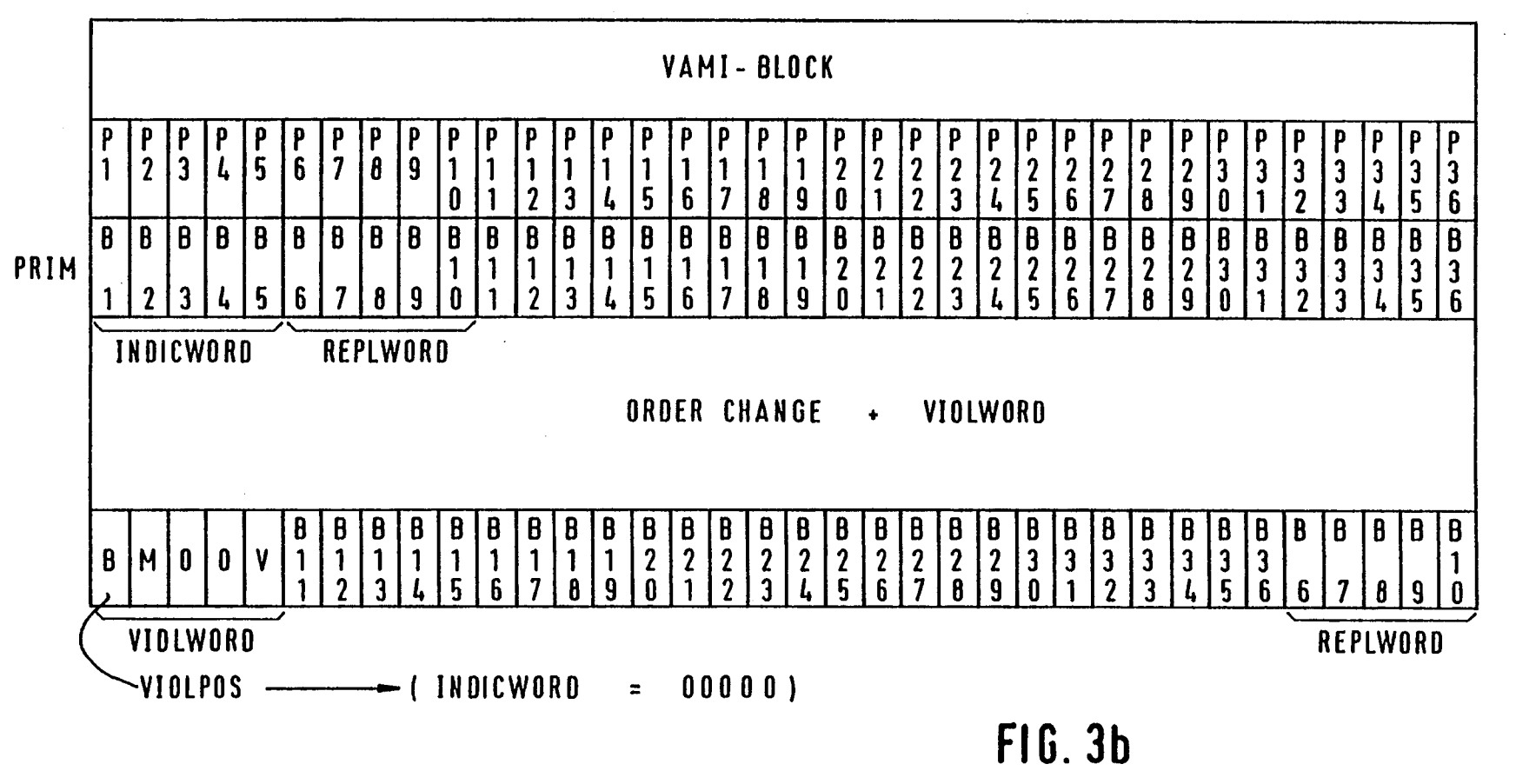
Figure 4A:
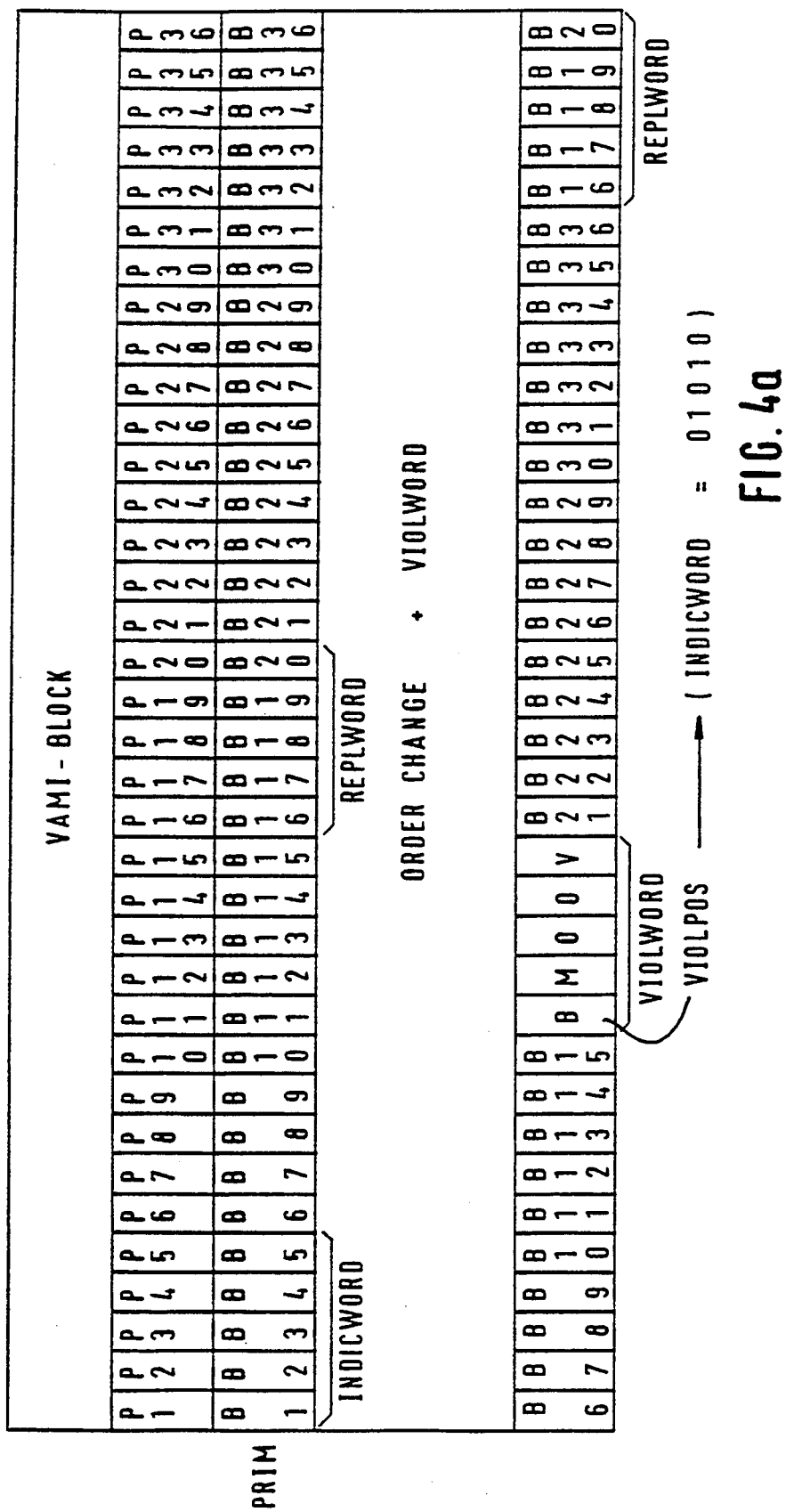
Figure 4B:
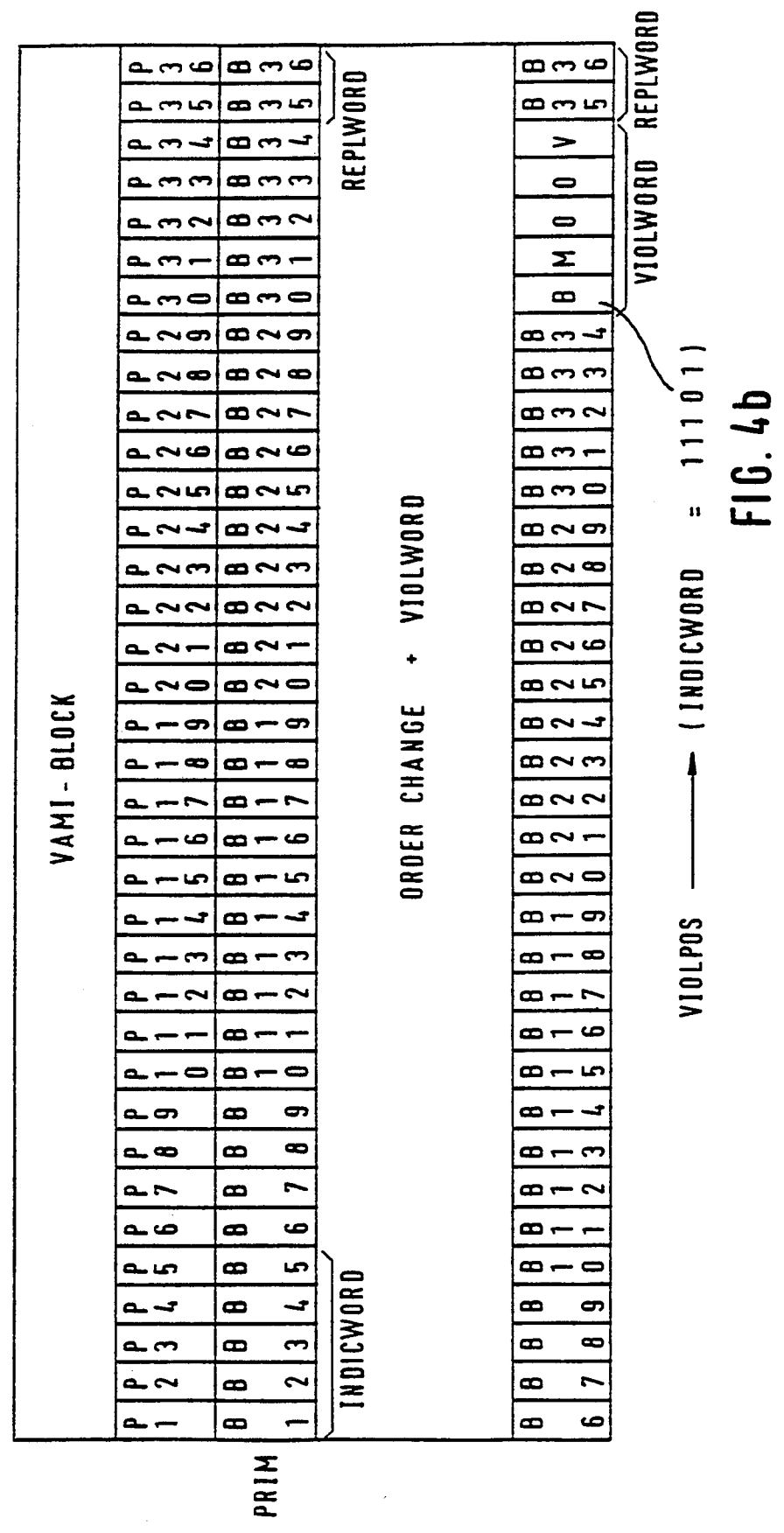

Looking now at FIG. 3b a VAMI-block is shown where VIOLPOS is calculated as the first position p1 of the reordered block and where REPLWORD consequently contains bits b6; ...; b10 which are inserted in the last 5 positions p32; ...; p36 of the reordered block. Comparing the final bit order in FIG. 3a and 3b it can be seen that at least 26 primary bits are in matching positions thus considerably reducing the above mentioned error multiplication. In fact this error multiplication is reduced to on average 10 divided by 2, for a violation word of length 5. Other reordering schemes are possible which result in error multiplication factors between the above extreme values mentioned, but the combination of reordering schemes as described above results in a minimal error multiplication. In FIG. 4a and 4b it is demonstrated that the above solution still holds for other values of VIOLPOS according to different values of INDICWORD. In FIG. 4a bits b1; ...; b5 of INDICWORD have value 01010 giving as VIOLPOS 10+1=p11 and determining REPLWORD as b16; ...; b20. In FIG. 4b a specific example is shown where INDICWORD is equal to 11101 giving as VIOLPOS 29+1=p30. It can be seen that the bits replaced by VIOLWORD give a REPLWORD of variable length because VIOLWORD can occupy some of the second predetermined positions p32; ...; p35. When VIOLPOS is for instance, determined to be p32 no bits are replaced and REPLWORD is empty. In the example of FIG. 4b only b35 and b36 are replaced. REPLWORD consequently contains only two bits and these bits have to be placed at the second predetermined positions p32; ...; p36 insofar as these positions are not already occupied by VIOLWORD i.e. in this example REPLWORD has to be placed in p35 and p36.

From the above it is clear that the block structure of the coded symbol stream COD plays a crucial rule in this data transmission system. The receiver R can only reconstruct the primary and secondary bitstreams, PRIM and AUX respectively, by synchronizing on this block structure and so delineating the blocks. For this purpose a synchronization word SYNCWORD is introduced in the coded symbol stream COD on a regular basis. In this embodiment the transmitter T introduces this SYNCWORD, as is shown in FIG. 5, once every 57 blocks.

Figure 5:
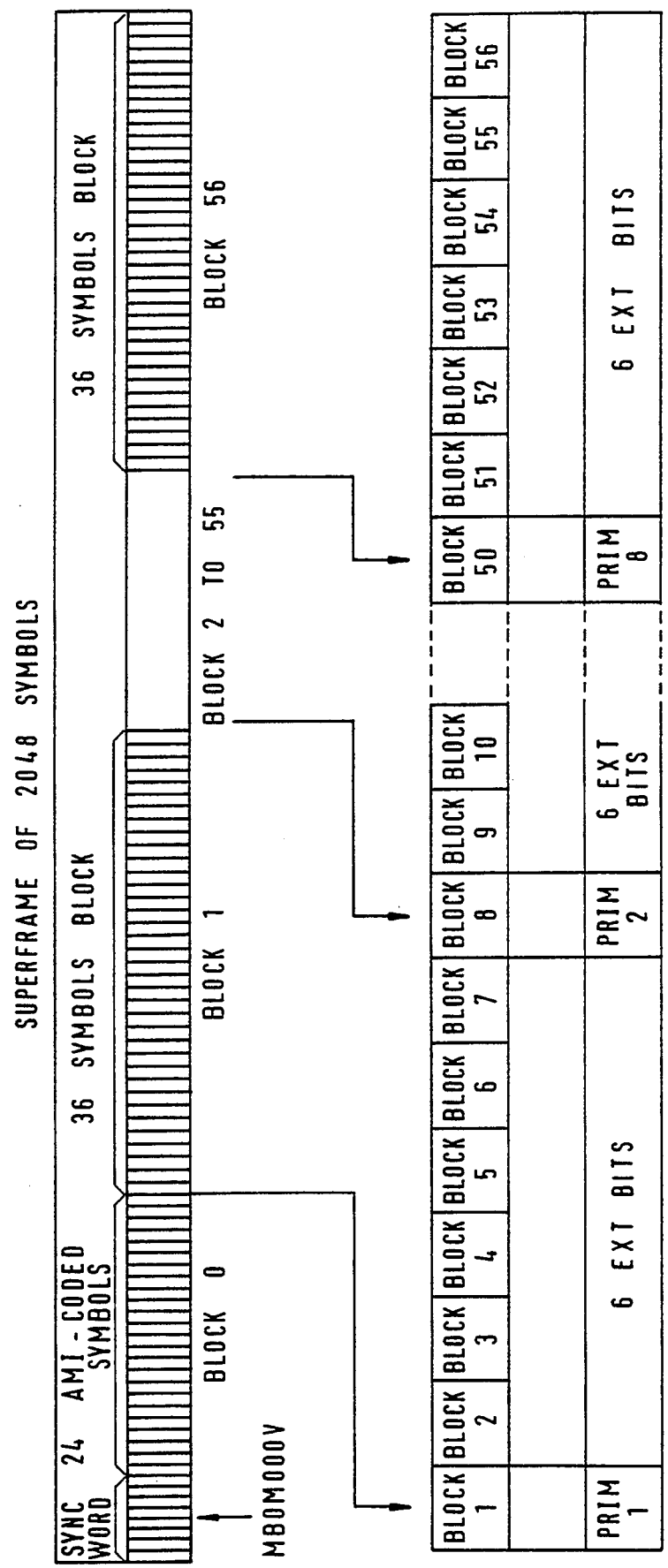
FIG. 5 shows the block structure of a coded symbol stream COD and the content of the secondary bitstream AUX in accordance with the invention.

In FIG. 5 the predetermined structure of the superframe is shown. It consists of a first block of Z, more specifically 32, symbols in which the first 8 positions are taken in by SYNCWORD, and 56 blocks of Y, more specifically 36, symbols in each of which exactly one secondary bit is coded. In this way and for the example of FIG. 5 with a bitrate of 2048 Kbit/s of PRIM, this superframe structure is repeated with a 1 kHz repetition rate. The 56 blocks of 36 symbols provide for the coding of a secondary bitstream AUX with a bitrate of 56 Kbit/s. The block of 32 bits is needed to fit exactly 2048 primary bits in the superframe and to have an integer bitrate for AUX. The transmission rate is according to the invention 2048 KBaud. The SYNCWORD contains the symbols MB0M000V which cannot be mistaken for any other symbol sequence, and can hence be detected reliably by the receiver R synchronizing on the block structure. In this block 8 primary data bits are inhibited from transmission because of the introduction of the SYNCWORD. By shifting all the bits of the primary bitstream PRIM 8 positions further and by multiplexing 8 primary bits in the secondary bitstream AUX they can nevertheless be transmitted without increasing the transmission rate.

FIG. 5 illustrates this solution in more detail. In the first block, 24 primary data bits are sent together with SYNCWORD coding them via the AMI-code without reordering them within this block. The next 56 blocks are coded via the procedure described above and 8 primary data bits are multiplexed at predetermined places in said secondary bitstream AUX, as shown in FIG. 5. The primary data bits are taken from the primary bitstream at specific positions relative to the block in which they are coded as a secondary bit. In FIG. 5 it is shown that a primary bit PRIM1 is coded in the secondary bitstream AUX in the first block of Y bits of a superframe. This primary bit PRIM1 is taken as the first bit following the previous block, i.e. the block of Z bits, and discarded from the primary bitstream PRIM before the latter is coded. Similarly primary bits PRIM2;. . . ;PRIM8 are multiplexed in the secondary bitstream AUX and coded in dedicated blocks, more specifically 8; 15;. . . ;50 by taking the bit following the previous block of Y bits, more specifically 7; 14;. . . ;49. Thus specific blocks within the superframe are dedicated to include the 8 primary data positions taken in by the SYNCWORD, e.g. block 1; 8;. . . ;50. The other blocks within the superframe carry secondary bits which are the physical input to the transmitter T and which therefore form the previously mentioned external bitstream EXT. The difference between EXT and AUX, and correspondingly between EXTO and AUXO, will be explained in detail with reference to the functional hardware schemes of the transmitter T of FIG. 6 and of the receiver R of FIG. 7 respectively. The receiver R consequently knows which secondary bits belong to the primary data PRIM.

It is to be noted that the same principle of dedication of blocks can be used for multiplexing other types of auxiliary data, e.g. voice and maintenance signals, and demultiplexing them accordingly in the receiver R.

A specific example of the bitrates of the bitstreams depicted in FIG. 5, is given in the following table :

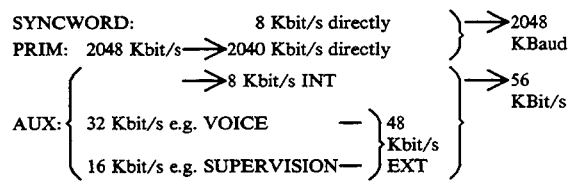

The bitrate of 2048 Kbit/sec is transformed in the transmission rate of 2048 KBaud of bipolar electrical signals wherein also the secondary bitstream AUX with a bitrate of 56 Kbit/sec is coded, the latter bitstream consisting of multiplexed data.

In conventional bipolar electrical data transmission one further measure is taken to improve the signal characteristics of the coded symbol stream COD, i.e. long strings of zeroes are replaced by a special code word containing a violation. This is necessary because the receiver R has to be able to recover the clock with which the transmitter T has transmitted the symbols. Long strings of zeroes cause the receiver to loose its synchronization with this clock which is clearly unpermittable. A well known remedy, e.g. as standardized in CCITT recommendation 6.703, is to use after the AMI-coding a further HDB3 coding substituting strings of 4 zeroes with such a special code word wherein the violation is used to distinguish and replace the code word at the receiving end.

A HDB4 type coding law is chosen in this embodiment as third or signal enhancing coding law, because its special code word cannot be mistaken for VIOLWORD or SYNCWORD. It substitutes a string of 5 zeroes with the special code word L000V.

In the special HDB4 code word, L is a second balancing bit, with the same goal as the previously mentioned first balancing bit B. L is determined according to the following table:

| L | previous M | previous V |
|---|---|---|
| – | + | + |
| 0 | + | – |
| 0 | – | + |
| + | – | – |

Other combinations of violation words, synchronizing words and third coding laws can be applied, where the third coding law will be of a HDBX type with X not necessarily equal to 4. Such a zero substituting law substitutes strings of X+1 zeroes with a special code word of the above type only containing at most X zeroes and at least one violation. The combination chosen in this embodiment is advantageous because it allows for the reuse of conventional HDB3 repeater stations as mentioned previously. The latter fact can be verified by comparing the signal characteristics of conventional HDB3-AMI signals and signals obtained using the coding strategy as described in this application.

Figure 6:
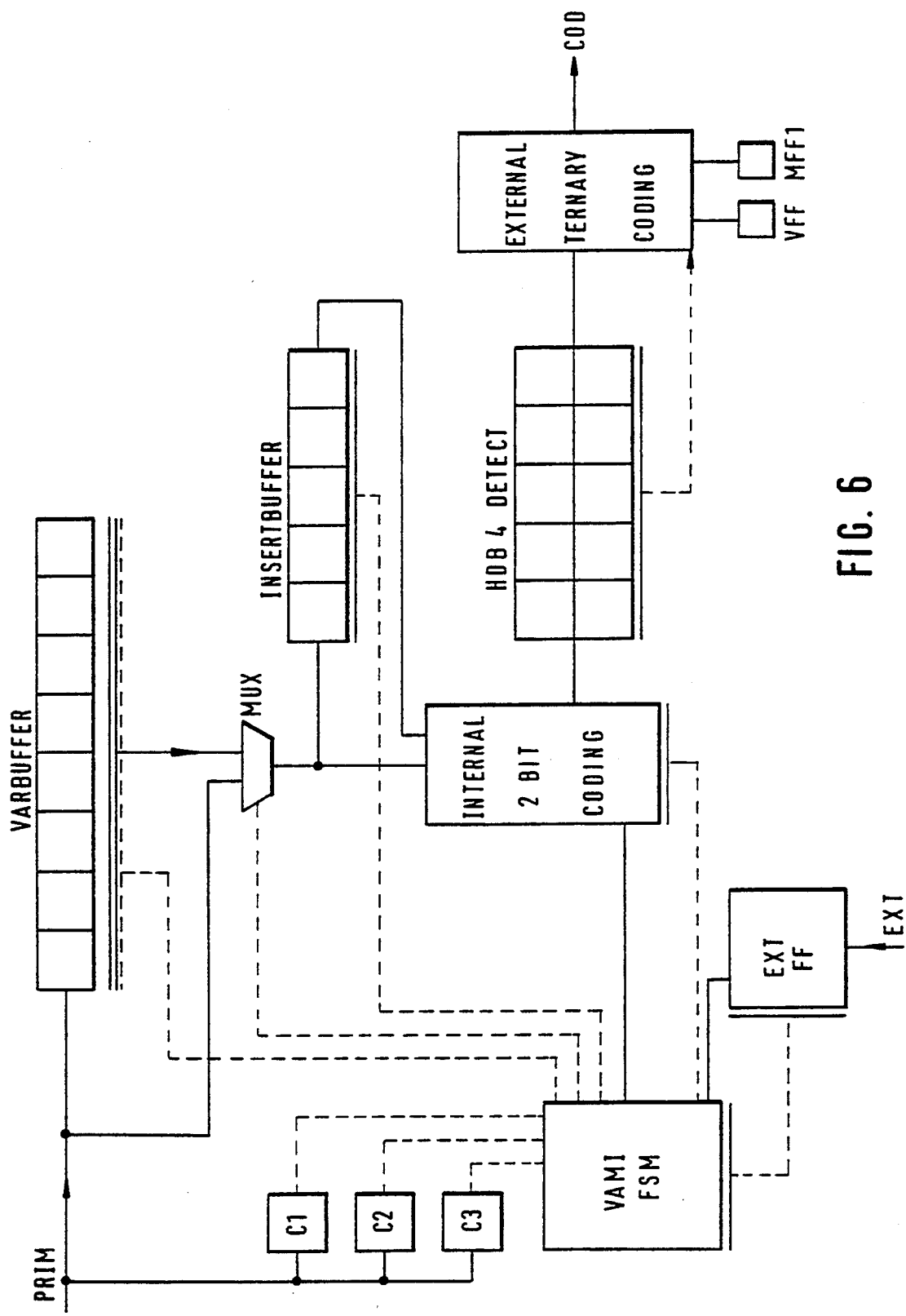
FIG. 6 shows a schematic diagram of a transmitter T of FIG. 1.

With reference to FIG. 6 a functional hardware scheme is described for the transmitter T.

The transmitter T has 2 binary inputs PRIM and EXT at which the primary and external bitstreams, PRIM and EXT respectively are applied. At an output COD of the transmitter T the bipolar electrical coded symbols COD are provided. The external bitstream EXT does not include the earlier mentioned primary bits which are to be multiplexed with EXT within the secondary bitstream AUX. These primary bits constitute an internal bitstream INT mentioned earlier with respect to FIG. 1. The external bitstream EXT is consequently not equal to the secondary bitstream AUX applied to the transmitter T in FIG. 1. This secondary bitstream AUX is in fact implicitly formed in the transmitter and was only depicted explicitly in FIG. 1 for sake of clarity. This multiplexing of primary bits is done implicitly via a block VAMI-FSM included in T shown in FIG. 6.

The bitstream PRIM is applied at an input of a variable length buffer VARBUFFER which has a maximum length of 8 positions. To be noted that this maximum length corresponds to the length of SYNCWORD. PRIM is also applied at an input of a multiplexer MUX which has a second input connected to an output of VARBUFFER. Both MUX and VARBUFFER are controlled by VAMI-FSM.

The output of MUX is firstly connected to a shift register INSERTBUFFER controlled by VAMI-FSM. INSERTBUFFER has a length equal to that of VIOLWORD, i.e. 5. The output of MUX is also connected to a block INTERNAL 2 BIT CODING which has a second input connected to the output of INSERT-BUFFER and a third input connected to VAMI-FSM. INTERNAL 2 BIT CODING, controlled by VAMI-FSM, codes binary data applied at its inputs in a quaternary internal code represented in 2 bit notation according to that data being a O, B, M or V. An output of INTERNAL 2 BIT CODING is connected to an input of a shift register HDB4 DETECT which has a length equal to that of the earlier mentioned HDB4 code word. HDB4 DETECT controls a block named EXTERNAL TERNARY CODING to an input of which the output signal of HDB4 DETECT is applied. EXTERNAL TERNARY CODING codes the internal quaternary code generated by HDB4 DETECT into the bipolar electrical symbols COD to be transmitted over the transmission medium TM via the transmitter output COD. It therefore remembers the polarity assigned by it to the previous mark and violation of the signal generated by HDB4 DETECT in flipflops named MFF1 and VFF respectively.

The block VAMI-FSM, which constitutes the primary intelligence of the transmitter T, is controlled by an output signal of each of three counters C1 to C3 to which PRIM is supplied. The first counter C1 starts counting at the beginning of the superframe and is reset after the complete superframe of 2048 symbols is completed. It generates an output signal at the beginning of a superframe. The counter C2 counts the number of blocks in the superframe and generates an output signal at the beginning of each block C2 is also reset after completion of the superframe. The counter C3 counts the number of bits in each block and generates at its output the value of this count C3 is reset after completion of each block.

It is to be noted that the above mentioned counters are connected to PRIM to enable them to count synchronously with the rate at which the primary bitstream is received. The way in which this is done is well known in the art and therefore not shown.

EXT is connected to VAMI-FSM via a flip-flop EXTFF. It is to be noted that EXTFF can be so controlled by VAMI-FSM that it contains the external data relevant at a particular instance. As this control operation is strongly dependent on the various bitstreams to be coded within the secondary bitstream AUX it is not shown. However, when the external bitstream EXT has a bitrate equal to 48 Kbit/s the necessary control can be simply performed by VAMI-FSM which has to clock the flipflop at the appropriate instance.

Following is with reference to FIG. 6 a description of the working of the transmitter.

When the counter C1 indicates by means of its output signal the beginning of a new superframe, VAMI-FSM instructs INTERNAL 2 BIT CODING via its control line to provide at its output the 2 bit representation of the synchronization word SYNCWORD. As this requires 8 clock ticks and the primary bitstream PRIM has to be continuously processed, 8 primary bits are via input PRIM shifted in VARBUFFER and simultaneously the synchronization word SYNCWORD is shifted through HDB4 DETECT and coded in bipolar signals in EXTERNAL TERNARY CODING. The first 24 primary bits received on PRIM are AMI coded by shifting them through VARBUFFER with length 8 and sending them from MUX under the control of VAMI-FSM to INTERNAL 2 BIT CODING. The 2 bit representations of these first 24 bits are then shifted through HDB4 DETECT and coded in bipolar form in EXTERNAL TERNARY CODING, this block can insert the HDB4 code word as will be explained later.

The following 56 blocks are coded as AMI- or VAMI blocks depending on the value of the corresponding bit in the secondary bitstream. Block counter C2 indicates to VAMI-FSM if this bit is to be taken from PRIM or from EXTFF, i.e. in blocks 1; 8; ... ; 50 the bit is taken from PRIM via VARBUFFER in order to send 8 primary bits replaced by SYNCWORD within the superframe as explained earlier and for all other blocks the bits taken from EXTFF. The multiplexing of these primary bits within AUX is realized by means of a pointer which at the beginning of the superframe points at bit 8 of VARBUFFER. Each time a bit of PRIM has to be taken as secondary bit, the bit indicated by the pointer is read by VAMI-FSM and used as secondary bit corresponding to the next block and the pointer is decremented by 1 bit position until position 0 is reached. From then on PRIM is directly switched via MUX without using VARBUFFER for further processing.

According to the value of the corresponding one of the above mentioned bits VAMI-FSM is switched to AMI processing, when that secondary bit is 0, or to VAMI processing, when that bit is 1.

In AMI processing the output of MUX is initially, during the first five bits of each block of Y bits, i.e. on first predetermined positions p1; ... ; p5, switched to the shift register INSERTBUFFER. During these five clock ticks INTERNAL 2 BIT CODING will be busy completing the previous block in determining the last five symbols of that previous block which are on this moment stored and have to be shifted out INSERT-BUFFER. From the sixth bit onwards the output of MUX is directly sent to INTERNAL 2 BIT CODING which codes the incoming bits via the AMI-rule and passes them to HDB4 DETECT. When counter C3 indicates that the position 32, i.e. the first of the second predetermined positions is reached within a block, then the control unit VAMI-FSM controls INSERT-BUFFER to supply its content to INTERNAL 2 BIT CODING which still codes via the AMI-rule, thus inserting the first five bits of the block at the end thereof. Meanwhile VAMI-FSM also enables INSERTBUFFER to receive the first five bits of the next block THROUGH MUX so completing a cycle.

In VAMI processing the first five bits of a block which represent the indication word INDICWORD are also stored in INSERTBUFFER as described in the previous paragraph. The value of the word in INSERT-BUFFER, i.e. INDICWORD is communicated to VAMI-FSM via the control line of INSERTBUFFER and when it is equal to the value provided by C3, VAMI-FSM instructs INTERNAL 2 BIT CODING to generate the violation word VIOLWORD and controls INSERTBUFFER to store the following 5 bits passed on through MUX which represent REPLWORD. When C3 communicates the 32nd position to VAMI-FSM or when this position has passed whilst introducing VIOLWORD, the content of INSERTBUFFER is under control of VAMI-FSM applied to the input of INTERNAL 2 BIT CODING which codes them at the end of the block. Meanwhile VAMI-FSM also enables INSERTBUFFER to receive the first five bits of the next block through MUX so completing a cycle.

It is to be noted that the above processing scheme still holds when C3 has passed 32 whilst VIOLWORD is generated. In this case and as was described earlier REPLWORD has a length shorter than 5. Whilst generating VIOLWORD in this case not only bits of REPLWORD but also the first bits of the next block will be shifted into INSERTBUFFER. As C2 indicates the beginning of a new block this does not give rise to extra problems, those bits in INSERTBUFFER belonging to REPLWORD will be shifted to INTERNAL 2 BIT CODING and with the aid of the counters C1 and C2 VAMI-FSM can control INSERTBUFFER so as to contain just the first five bits of the next block.

It is to be noted that INTERNAL 2 BIT CODING, except whilst generating VIOLWORD and SYNCWORD, always codes using the AMI-rule.

The output signal of INTERNAL 2 BIT CODING is then shifted through HDB4 DETECT and the internal 2 bit code is further processed by the block EXTERNAL TERNARY CODING which generates at its output the bipolar coded signal stream COD. The block EXTERNAL TERNARY CODING not only assigns bipolar values according to the previously mentioned tables and rules but also inserts the special HDB4 code word whenever it detects via its control line that HDB4 DETECT contains five zeroes. To supply these ternary symbols EXTERNAL TERNARY CODING needs to remember the polarity of the previous mark M and violation V in MFF1 and VFF respectively.

According to the above functional description, the realization of the blocks of FIG. 6 is obvious for a man skilled in the art and they are therefore not described in detail.

Figure 7:
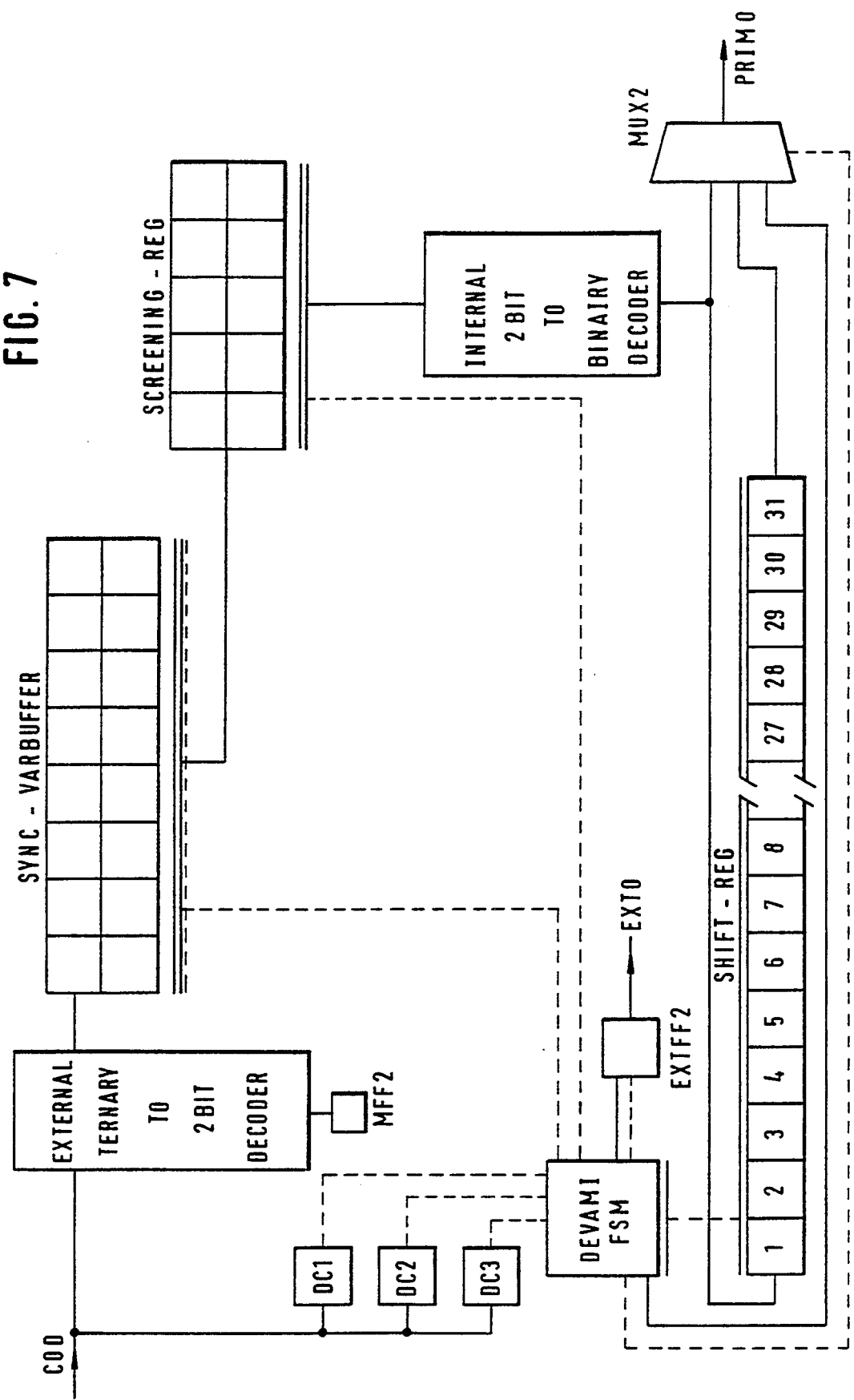
FIG. 7 shows a schematic diagram of a receiver R of FIG. 1.

With reference to FIG. 7 a functional hardware scheme is now described for the receiver R.

R has an input COD where the coded symbol stream COD is received, and two outputs PRIMO and EXTO where the primary and the external bitstreams PRIMO and EXTO respectively are provided. Regarding EXTO and PRIMO the same remarks can be made as for EXT and PRIM with respect to the transmitter T of FIG. 6. The reconstructed secondary bitstream AUXO is namely not shown in FIG. 7 since it is an internal signal in the receiver R. As a consequence only a part of AUXO, i.e. the reconstructed external bitstream EXTO, is shown as an explicit output bitstream. Another part of AUXO is an internal reconstructed bitstream containing part of PRIMO and which is directly decoded in the receiver R to reconstruct the primary bitstream PRIMO as described hereafter. The coded symbol stream COD is applied to an input of a first decoder EXTERNAL TERNARY TO 2 BIT DECODER which delivers ternary symbols applied to its input in 2 bit representation according to the received symbol of COD being a mark M, a zero 0 or a violation V. It therefore has to remember the polarity of the previously received mark of COD which is stored by means of a flipflop MFF2 connected to the first decoder. The output signal of EXTERNAL TERNARY TO 2 BIT DECODER is applied to an input of a variable length shift register SYNC-VARBUFFER which is controlled by a control unit DEVAMI-FSM. An output of SYNC-VARBUFFER constitutes an input another shift register SCREENING-REG which has a length equal to the length of VIOLWORD, i.e. 5. SCREENING-REG is connected via a control line to DEVAMI-FSM and provides output bits which are applied to an input of a second decoder INTERNAL 2 BIT TO BINARY DECODER. The latter block decodes the 2 bit representation coming from SCREENING-REG into a binary representation according to the AMI-rule. This representation is applied to an input of a multiplexer MUX2 controlled by DEVAMI-FSM and to an input of a shift register SHIFT-REG which is also controlled by DEVAMI-FSM. MUX2 has a second input to which an output of the shift register SHIFT-REG, is applied and a third input to which an output of DEVAMI-FSM is connected. SHIFT-REG has a length equal to the length of a block of Y bits, minus the length of VIOLWORD, i.e. 31. MUX2 generates at its output PRIMO the reconstructed primary bitstream PRIMO.

R has its primary intelligence in the control unit DEVAMI-FSM. This unit is controlled by three counters DC1 to DC3 to the input of which COD is applied.

The first counter DC1 counts the symbols received in the superframe and generates a control signal to DEVAMI-FSM at the beginning of the frame. DC1 is reset after a complete superframe of 2048 symbols is received. The counter DC2 counts the number of blocks in the superframe and provides the value of that count to DEVAMI-FSM. DC2 is also reset after completion of the superframe. The counter DC3 counts the number of symbols being received within each block and provides its count value to DEVAMI-FSM. DC3 is reset after receipt of a complete block. Counters DC1/3 are connected to the input COD of the receiver R. In this way only they can count the number of incoming coded symbols COD.

The binary external bitstream EXTO extracted from the signal COD by DEVAMI-FSM is directly written in a flipflop EXTFF2. EXTFF2 provides the signal EXTO at the output EXTO which can be achieved by appropriately clocking EXTFF2 via DEVAMI-FSM.

Following is with reference to FIG. 7 a description of the working of the receiver R wherein the description of the synchronization operation of the receiver on SYNCWORD is omitted as this can be achieved by conventional synchronizing algorithms.

The first block of 32 symbols of the signal COD is processed at the beginning of the superframe. This beginning is indicated to DEVAMI-FSM by DC1, whereafter DEVAMI-FSM checks whether the SYNCWORD is detected in SYNC-VARBUFFER at the right moment and updates a synchronization algorithm accordingly, i.e. when the first 8 symbols are shifted in SYNC-VARBUFFER after the start of the new superframe as indicated by DC1. If SYNCWORD is detected by DEVAMI-FSM it is discarded from the data flow and a pointer to SYNC-VARBUFFER is reset so that it points to the beginning of the buffer, i.e. its length is zero meaning that the following symbols are directly passed from EXTERNAL TERNARY TO 2 BIT DECODER to SCREENING-REG. The following 24 symbols of the first block are via SCREENING-REG passed to INTERNAL 2 BIT TO BINARY DECODER to be decoded via the AMI-rule and are then directly sent in binary form via MUX2 and under control of DEVAMI-FSM to the output PRIMO where the primary bitstream PRIMO is provided.

DEVAMI-FSM then detects whether each of the next 56 blocks are coded using either the VAMI- or AMI-code and controls their reordering before sending them via MUX2 to the output PRIMO. This detection is done by checking whether SCREENING-REG contains VIOLWORD or not.

In the course of shifting a complete block through SCREENING-REG every combination of 5 consecutive 2 bit representations is compared by DEVAMI-FSM with the internally stored 2 bit representation of VIOLWORD. If VIOLWORD does not appear before the last symbol of that block is shifted in the last position of SCREENING-REG, that block is interpreted as an AMI-block and the secondary bit corresponding to this block is interpreted as a zero. If moreover this secondary bit belongs to the external bitstream as indicated by the number of the block in the superframe generated by DC2, then it is written in EXTFF2 by DEVAMI-FSM. When VIOLWORD is detected in SCREENING-REG before the last symbol of that block is shifted in SCREENING-REG then that block is interpreted as a VAMI-block and resulting in a binary 1 for the corresponding secondary bit.

It is to be noted that SCREENING-REG is also used to eliminate the special HDB4 code word from the signal stream. DEVAMI-FSM will namely continuously compare the content of SCREENING-REG to the internally stored 2 bit representation of the special code word and when detected overwrite the content of SCREENING-REG with an all zeroes word of length 5, i.e. reset SCREENING-REG.

Following is a description of the further processing of AMI- and VAMI-blocks without however taking into account the 8 secondary bits replaced by SYNC-WORD, which have to be inserted in the primary bitstream PRIMO. This insertion will be described later.

If the block is detected to be an AMI-block the content of SCREENING-REG at the end of that block, as indicated by DC3, consists of the 32nd to 36th symbols of that block which correspond to the first five symbols of the block of primary bits to appear on the output PRIMO as explained earlier with respect to the working of the transmitter T. Under control of DEVAMI-FSM these 5 symbols are after decoding routed through MUX2 to the output PRIMO. Hereafter the complete shift register SHIFT-REG is again under control of DEVAMI-FSM shifted through MUX2 to the output.

When VIOLWORD is detected in SCREENING-REG, the block is a VAMI-block. The value of counter DC3 at the moment VIOLWORD is detected, decremented by five gives the value of VIOLPOS from which INDICWORD and hence the first five bits of this VAMI block can be derived. INDICWORD is temporarily stored in DEVAMI-FSM while the remaining symbols of the block are decoded in INTERNAL 2BIT TO BINARY DECODER and shifted in SHIFT-REG. The decoding is always done via the AMI-rule. When the last symbol of the VAMI-block is shifted in SCREENING-REG, the latter shift register contains REPLWORD. To provide the reconstructed primary bitstream PRIMO at the output of MUX2, DEVAMI-FSM simultaneously shifts the stored INDICWORD via a dataline connecting DEVAMI-FSM to MUX2 to the output PRIMO of the receiver R, and controls SHIFT-REG in such a way that the bits corresponding to VIOLWORD in SHIFT-REG are overwritten with the bits generated by INTERNAL 2 BIT TO BINARY DECODER corresponding to REPLWORD. Whereafter the whole content of SHIFT-REG can be shifted under control of DEVAMI-FSM through MUX2 to the output PRIMO.

When VIOLWORD occupies one or more of the second predetermined positions, i.e. of the last five positions, REPLWORD does not completely occupy SCREENING-REG and DEVAMI-FSM will accordingly have to act so as to overwrite less than five bits in SHIFT-REG.

As mentioned earlier the reconstructed secondary bitstream AUXO is not explicitly shown in FIG. 7 and is reconstructed by DEVAMI-FSM by interpreting every block of 36 bits as an AMI- or a VAMI-block. The block counter DC2 indicates to DEVAMI-FSM which block is being received within a superframe and thus indicates to DEVAMI-FSM whether the secondary bit corresponding to that block is part of the reconstructed primary bitstream PRIMO or of the reconstructed external bitstream EXTO. When DC2 indicates that block 1; 8; ...; 50 is being received DEVAMI-FSM has to multiplex the secondary bits corresponding to these blocks in the reconstructed primary bitstream PRIMO as will be explained in detail in the following paragraph. The other secondary bits are applied via EXTFF2 to the output EXTO of the receiver R.

It is to be noted that the principle described in this paragraph can equally well be used to demultiplex different bitstreams within the reconstructed external bitstream EXTO.

As mentioned earlier the secondary bits corresponding to the previously mentioned blocks 1; 8; ...; 50 of the superframe have to be multiplexed within the reconstructed primary bitstream PRIMO. This is done under control of DEVAMI-FSM which sends this secondary bit via the dataline connecting DEVAMI-FSM and MUX2 through MUX2, before the block in which this secondary bit was coded is sent through MUX2 to PRIMO. When this bit is passed through MUX2 no other symbols in 2 bit representation or bit in SHIFT-REG can be shifted towards the output PRIMO because this would lead to an unsolvable output contention. However at the same time a following coded symbol is received on the input COD. To avoid input contention SYNC-VARBUFFER is, as mentioned before, implemented as a variable length buffer. DEVAMI-FSM stores a pointer to this buffer indicating its length, i.e. the pointer indicates which position of SYNC-VARBUFFER is to be connected to the input of SCREENING-REG.

After detection of SYNCWORD this pointer is reset, i.e. set to zero, indicating that the output signal EXTERNAL TERNARY TO 2 BIT DECODER is directly shifted into SCREENING-REG. At the moment a secondary bit is passed through MUX2 DEVAMI-FSM increments the pointer to SYNC-VARBUFFER with unity thereby shifting the 2 bit representation generated by EXTERNAL TERNARY TO 2 BIT DECODER of the first symbol of the next block into SYNC-VARBUFFER. Simultaneously the input of SCREENING-REG is reconnected to the position of SYNC-VARBUFFER as indicated by the pointer. This procedure is repeated for all 8 blocks carrying a secondary bit taken from the primary bitstream PRIM thereby avoiding input contention. After the 50th block the pointer has a value of 8 indicating that the complete length of SYNC-VARBUFFER is used. Thus the receiver R is able at the beginning of a new superframe to shift the complete 2 bit representation of SYNCWORD into SYNC-VARBUFFER and update the synchronization algorithm or begin another cycle as described in the above.

While the principles of the invention have been described above in connection with specific apparatus, it is to be clearly understood that this description is made only by way of example and not as a limitation on the scope of the invention.

We claim:

1. Data transmission system for transmission of a main bitstream to additionally transmit an auxiliary bitstream together with said main bitstream, said data transmission system comprising a transmitter including frame means for arranging said main bitstream in superframes, each of said superframes including a plurality of periodically occurring blocks, each of said blocks having a block length of Y bits, where Y is a predetermined integer greater than 1, encoding means for encoding each of said blocks of Y bits according to a respective coding law such that any block of Y bits may be selectively encoded with either a first or a second coding law and a block encoded with the second coding law violates the first coding law, and means for determining said respective coding law as a function of the value of at least one corresponding information unit of said auxiliary bitstream, whereby the auxiliary bitstream is transmitted synchronously with the main bitstream, independent of the data content of the main bitstream.

2. Data transmission system according to claim 1, wherein said second coding law is derived from said first coding law by introducing a violation in at least one position within each of said blocks which is coded by means of said second coding law, each said violation is realized by introducing symbols consisting of combinations of bits not permitted under said first coding law, and each said violation is introduced according to a violation law which is a predetermined function of an indication word which consists of bits of said main bitstream located at respective predetermined positions within the respective said block.

3. Data transmission system according to claim 2, wherein within each of said blocks coded according to said second coding law, a predetermined violation word is introduced according to said violation law which replaces a corresponding number of bits of said main bitstream, and each said predetermined violation word contains at least one violation and at least one symbol not violating said first coding law.

4. Data transmission system according to claim 3, wherein the position of said violation word is a predetermined function of the value of said indication word, and said indication word is inhibited from transmission thus leaving place for said violation word to be transmitted within said respective block while preserving said block length of Y bits.

5. Data transmission system according to claim 4, wherein said transmitter determines the position of said violation word and reorders bits in other positions than said first predetermined positions in the following manner:

the first of said bits are released in sequence in the first positions of said blocks leaving open second predetermined positions until the position preceding the position of said violation word is reached, the violation word is then introduced, the bits replaced by said violation word are stored, the following bits are again released in sequence inserting said bits replaced by said violation word at second predetermined positions within said block, and said blocks are then coded by said transmitter using said first coding law transmitting the appropriate symbols of said violation word.

6. Data transmission system according to claim 5, wherein whenever said first coding law is used for said block of Y bits:

said transmitter stores the bits of the indication word at said first predetermined positions and reorders the other bits by releasing them in sequence in the first positions of said blocks, inserting said indication word at said second predetermined positions, and said blocks are then coded by said transmitter using said first coding law.

7. Data transmission system according to claim 6, wherein said first predetermined positions are the first five positions of said block and said second predetermined positions are the last five positions of said block.

8. Data transmission system according to claim 2, wherein said first coding law is the AMI-code for bipolar electrical signals, and said second coding law violates said AMI-code by permitting two subsequent marks of the same polarity, the last mark being said violation.

9. Data transmission system according to claim 8, wherein said violation word contains at least a first balancing bit which is either a mark or a zero such that subsequent violations are of opposite polarity; and said violation word contains at least one zero separating said violation from a preceding symbol which can be a mark.

10. Data transmission system according to claim 1, wherein a receiver, also included in said date transmission system, synchronizes on the block structure of a coded symbol stream, transmitted by said transmitter, using said synchronization word.

11. Data transmission system according to claim 1, wherein said superframe consists of M+1 blocks:

a block of Z bits of said main bitstream which is coded in its original sequence, using said first coding law and M blocks of Y bits of said main bitstream coded via a selected one of said first and said second coding law.

12. Data transmission system according to claim 11, wherein said block of Z bits contains said synchronization word and a number of bits of said main bitstream equal to the number of symbols in said synchronization word are multiplexed in said auxiliary bitstream and coded in predetermined blocks within said superframe.

13. Data transmission system according to claim 1, wherein after said main and auxiliary bitstreams are coded, the resulting coded symbol stream is further coded using a signal enhancing coding law.

14. Data transmission system according to claim 13, wherein said first coding law is the AMI-code for bipolar electrical signals, and said second coding law violates said AMI-code by permitting two subsequent marks of the same polarity, the last mark being said violation, and said signal enhancing coding law is a third coding law, according to which a string of X+1 zeroes is substituted by a special code word containing at most X zeroes and at least one violation.

15. Data transmission system according to claim 12, wherein said first coding law is the AMI-code for bipolar electrical signals, said second coding law violates said AMI-code by permitting two subsequent marks of the same polarity, the last mark being said violation, said violation word is BM00V where M is said mark, V is said violation, and B is a first balancing bit determined according to the following table

| B | previous M | previous V |
|---|---|---|
| 0 | + | + |
| − | + | − |
| + | − | + |
| 0 | − | − | and said synchronization word is MB0M000V.

16. Data transmission system according to claim 13, wherein said violation word contains at least a first balancing bit which is either a mark or a zero such that subsequent violation are of opposite polarity; and said violation word contains at least one zero separating said violation from a preceding symbol which can be a mark, and said third coding law is of the HDB4 type, according to which a string of 5 zeroes is substituted by a code word L000V, where V is said violation and L is a second balancing bit determined according to the following table

| L | previous M | previous V |
|---|---|---|
| − | + | + |
| 0 | + | − |
| 0 | − | + |
| + | − | − |

17. Data transmission system according to claim 16, wherein said auxiliary bitstream comprises different multiplexed channels, a specific channel being coded in respective specific blocks of Y bits within said superframe.

18. Data transmission system according to claim 1, wherein said auxiliary bitstream comprises different multiplexed channels, a specific channel being coded in specific blocks of Y bits within said superframe.

* * * * *